United States Patent [19]
Senso

[11] Patent Number: 4,680,746
[45] Date of Patent: Jul. 14, 1987

[54] RECORDING DISC ROTARY DRIVE CONTROL APPARATUS

[75] Inventor: Hitoshi Senso, Saitama, Japan

[73] Assignee: Pioneer Electronic Corporation, Tokyo, Japan

[21] Appl. No.: 713,113

[22] Filed: Mar. 18, 1985

[30] Foreign Application Priority Data

Mar. 16, 1984 [JP] Japan ................................. 59-51651

[51] Int. Cl.⁴ ............................................. G11B 19/24
[52] U.S. Cl. ..................................... 369/50; 369/111; 369/240; 360/73
[58] Field of Search ................... 369/50, 43, 111, 239, 369/240; 358/342, 338, 322; 360/73

[56] References Cited

U.S. PATENT DOCUMENTS

| | | | |
|---|---|---|---|
| 4,190,860 | 2/1980 | Somers | 360/73 |
| 4,223,349 | 9/1980 | Dakin | 369/50 |
| 4,236,050 | 11/1980 | Winslow | 360/73 |
| 4,439,849 | 3/1984 | Naleshima | 369/50 |

*Primary Examiner*—Alan Faber
*Attorney, Agent, or Firm*—Sughrue, Mion, Zinn, Macpeak and Seas

[57] ABSTRACT

A low-cost recording disc rotary drive control apparatus having a simple circuit configuration employing no voltage divider or frequency-to-voltage converter. A position pulse signal with a period proportional to a position detecting signal produced by a position detecting device is generated, and a rotational pulse signal having a frequency proportional to the rate of rotation of the motor is generated. The supply of a control signal to the motor is effected while supply of an accelerating signal thereto is suspended using a switching device.

1 Claim, 6 Drawing Figures

4,680,746

RECORDING DISC ROTARY DRIVE CONTROL APPARATUS

BACKGROUND OF THE INVENTION

The invention relates to a recording disc rotary drive control apparatus, and more particularly to a video disc rotary drive control apparatus wherein data is written on the video disc with a nearly constant packing line density.

FIG. 1 shows a conventional recording disc rotary drive control apparatus. In FIG. 1, there is shown a CLV (Constant Linear Velocity) disc 1 onto which data is spirally recorded at a constant linear speed and the disc 1 is driven by a spindle motor 2. The data stored on the disc is ready by a pickup 3 located thereabove and, as the disc 1 is played, the pickup 3 is moved linearly by a feed mechanism using a slider, etc. (not shown) in the radial direction thereof.

The output signal of the pickup 3 is applied to a signal processing circuit 4 for correction and the like. A playback synchronizing signal extracting circuit 5 is connected to the output of the signal processing circuit 4. The playback synchronizing signal extracting circuit 5 separates and extracts only a playback synchronizing signal from the output signal of the signal processing circuit 4 and supplies the extracted signal to a control signal generating circuit 6. The control signal generating circuit 6, for instance, compares the phases of the playback synchronizing signal and a reference synchronizing signal and produces a control signal representing the comparison result. A driving circuit 8 for driving the motor 2 is connected to the control signal generating circuit 6 through a changeover switch 7.

The position of the pickup 3 is detected by a position detector 9. The position detector 9 produces a position detecting signal at a level proportional to the distance covered by the pickup 3 in moving from the reference position. A voltage divider 10 is connected to the position detector 9, and a set voltage generating circuit 11 is connected to the output of the divider 10. The set voltage generating circuit 11, for instance, is composed of a voltage divider for dividing the output voltage of the divider 10. The output of the set voltage generating circuit 11 is connected to one input of a comparator 12. A frequency generator 13, coupled to the rotary shaft of the motor 2, produces pulses at a frequency proportional to the rate of rotation of the motor 2. A frequency-to-voltage converter 14 is connected to the output of the frequency generator 13, and the output voltage of the frequency-to-voltage converter 14 applied to the other input of the comparator 12.

The comparator compares the output voltage of the set voltage generating circuit 11 with that of the frequency-to-voltage converter 14 and drives the changeover switch 7 depending on the state of the output signal of the comparator. The changeover switch 7 normally relays an accelerating voltage $V_x$ to the driving circuit 8 and the control signal produced by the control signal generating circuit 6 thereto while it is driven.

In the conventional recording disc rotary drive control apparatus thus constructed, the accelerating voltage $V_x$ is supplied to the driving circuit 8 through the changeover switch 7 at the time the motor 2 is started and while the rate of rotation of the motor 2 is increasing.

A voltage corresponding to the distance covered by the pickup 3 in moving from the reference position in the radial direction thereof is produced by the position detector 9. This voltage is converted by the divider 10 into a voltage representing the reciprocal of the distance covered.

In this case, given that the rate of rotation of a disc being played at a linear velocity of v is w, at a pickup position a distance r from the center of the record, the relation v=rw is formed. Assuming that the linear velocity is constant, the distance r is inversely proportional to the rate of rotation w. Accordingly, since the output voltage of the position detector 9 is proportional to the distance r, the output voltage of the divider 10 is 1/r, that is, proportional to the rate of rotation w. The output voltage of the divider 10 is made to be proportional to the rate of rotation of the motor 2, enabling the playback synchronizing signal extracting circuit 5 to extract the playback synchronizing signal from the output signal of the signal processing circuit 4 in the set voltage generating circuit 11. For instance, as shown in FIG. 2, the output voltage (shown by a solid line) of the voltage divider 10 is divided at a predetermined ratio to become a set voltage (shown by a broken line and, given that the output voltage of the divider 10 at the position a of the pickup 3 is $V_a$ and its set voltage is $V_b$ whereas the output voltage of the divider 10 at the position b on the side closer to the periphery than the position a is $V_a'$ and its set voltage is $V_b'$, the relation $V_b/V_a = V_b'/V_a'$ is satisfied.

The pulse signal produced by the frequency generator 13 at a frequency proportional to the rate of rotation of the motor 2 is converted by the frequency-to-voltage converter 14 into a voltage proportional to the frequency at which the pulse is produced. The voltage thus converted is compared with the set voltage in the comparator 12.

When the voltage converted is smaller than the set voltage, the accelerating voltage $V_x$ is, as mentioned above, supplied to the driving circuit 8 in an attempt to increase the rate of rotation of the motor 2. If the voltage converted is greater than the set voltage, the output level of the comparator 12 will be inverted from the low to the high level. In response to the high level supplied to the changeover switch 7 as a switching signal, the changeover switch 7 is switched over so that the control signal produced from the control signal generating circuit 6 is applied to the driving circuit 8. Accordingly, the rate of rotation of the motor 2 is loop-controlled in response to the control signal based on the synchronizing signal.

With the above-described arrangement, playback is made possible from any position on the disc, despite a difference in the rate of rotation of the motor 2 depending on the pickup position.

However, the conventional rotary drive control apparatus is disadvantageous in that it requires a costly voltage divider having a complicated circuit configuration. Moreover, high conversion accuracy is needed for the frequency-to-voltage converter, thus making the circuit of the apparatus as a whole complicated and expensive.

SUMMARY OF THE INVENTION

It is therefore an object of the present invention to provide a low-cost recording disc rotary drive control apparatus having a circuit simple in configuration and which does not employ such a voltage divider and frequency-to-voltage converter.

The recording disc rotary drive control apparatus according to the present invention is characterized in that a position pulse signal with a period proportional to the position detecting signal produced by position detecting means is generated, and a rotational pulse signal having a frequency proportional to the rate of rotation of a motor is generated, wherein the supply of a control signal to the motor is effected, while supply of an accelerating signal thereto is suspended, using switching means through the method of counting the position pulse with the generation of the rotational pulse signal as a basis and producing the rotational pulse signal until the counted value reaches a predetermined value.

DESCRIPTION OF THE PREFERRED EMBODIMENTS

Figure 1:
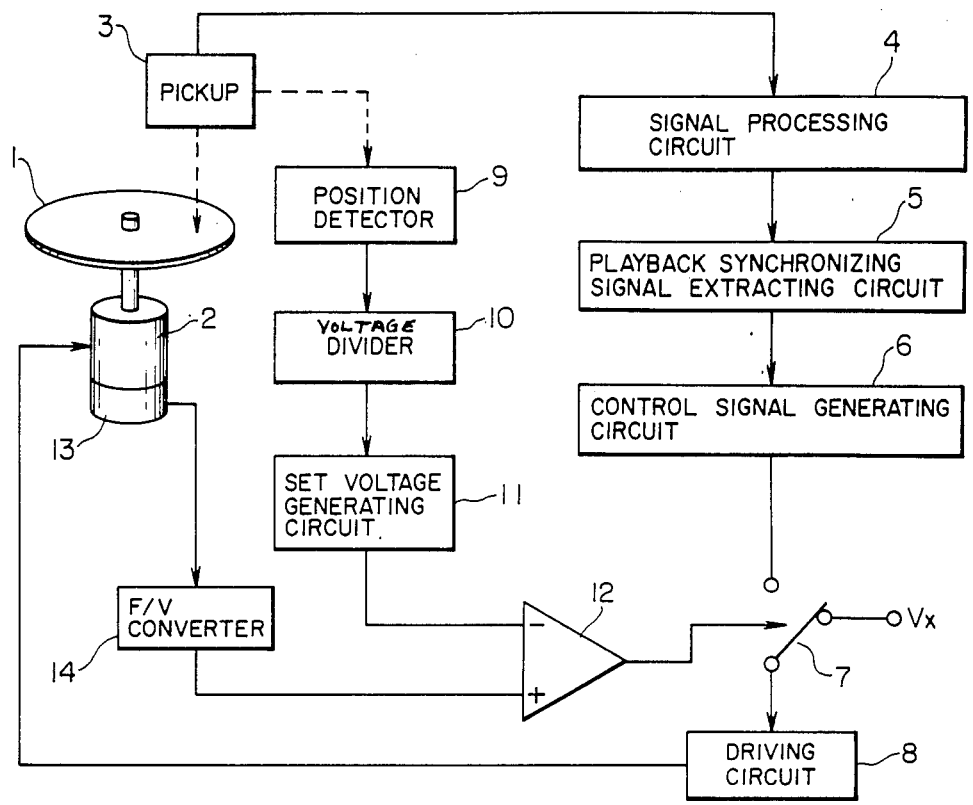
FIG. 1 is a block diagram of a conventional recording disc rotary drive control apparatus.
Figure 3:
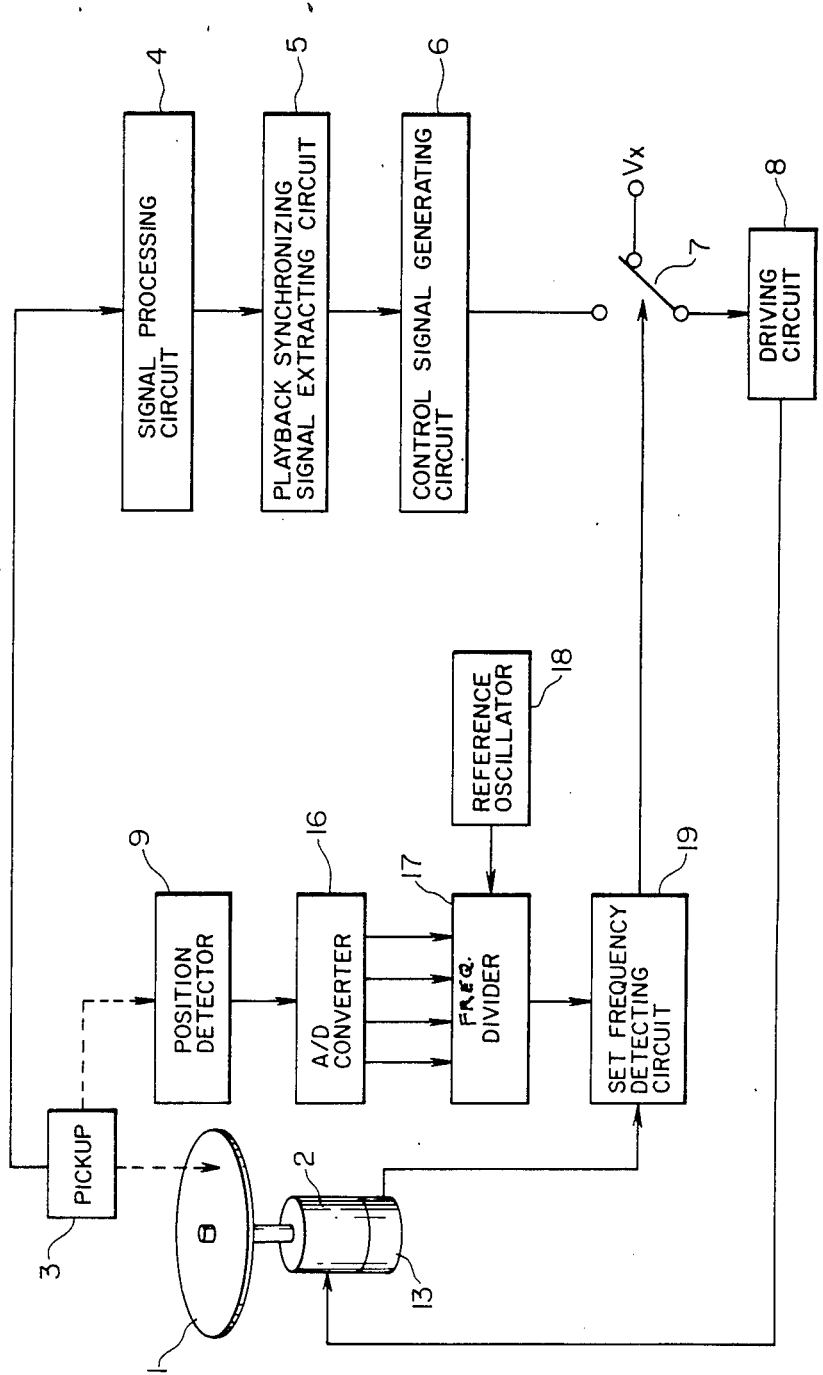
FIG. 3 is a block diagram of an embodimemnt of the present invention.
Figure 6:
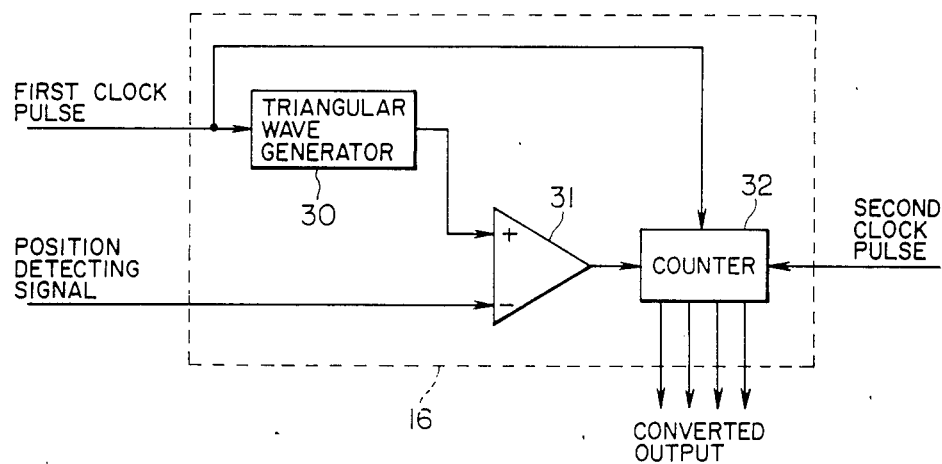
FIG. 6 is a block diagram of an analog-to-digital converter circuit used in the apparatus of FIG. 3.

Referring now to FIGS. 3 and 6, a preferred embodiment of the present invention will be described. In FIG. 3, like parts in FIG. 1 are identified by like reference numbers.

A frequency divider 17 is connected to the output of a position detector 9 through an analog-to-digital converter 16. The divider 17 divides a clock pulse signal from a reference oscillator 18 at a dividing ratio proportional to the digital value produced by the analog-to-digital converter 16. A set frequency detecting circuit 19 is connected to the output of the divider 17. The output of a rotary pulse generator 13 is connected to the input of the set frequency detecting circuit 19.

Figure 4:
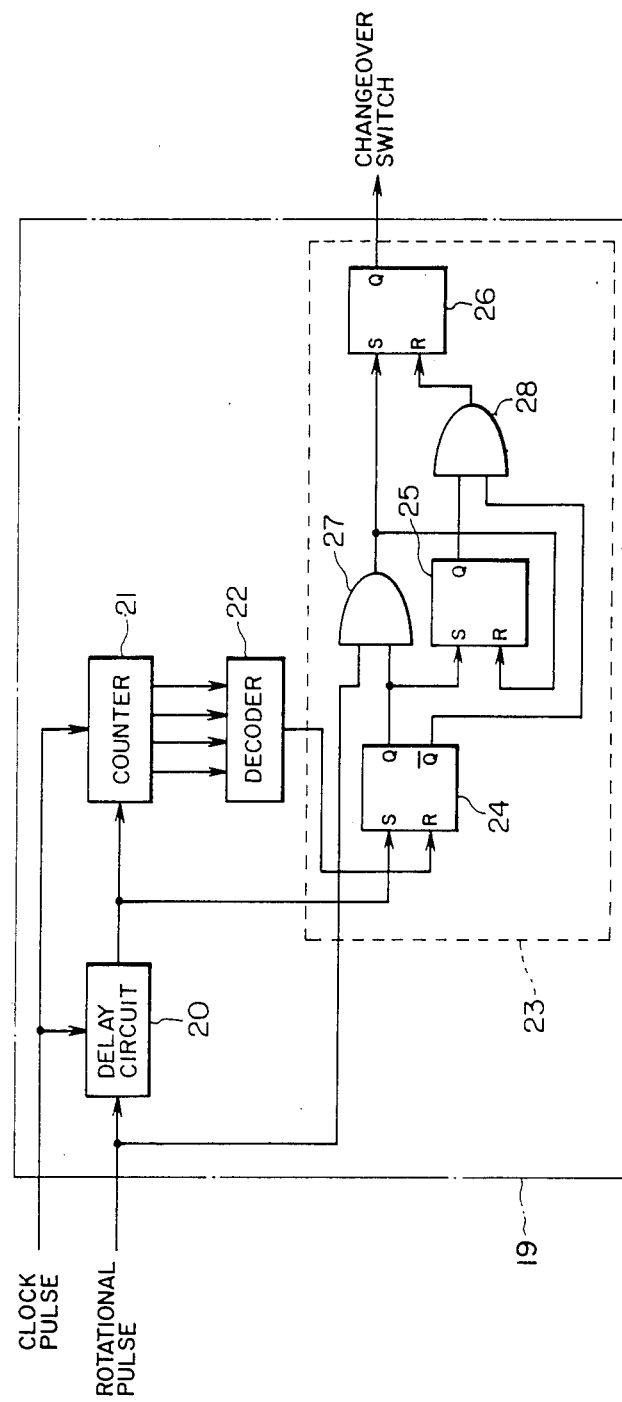
FIG. 4 is a detailed block diagram of the set frequency detecting circuit of FIG. 3.

As shown in FIG. 4, the set frequency detecting circuit 19 includes a delay circuit 20 for producing a rotational pulse signal by delaying the output of the rotational pulse generator 13 a predetermined clock period using the divided pulse signal from the divider 17 as a clock, a counter 21 for counting pulses of the divided pulse signal when the output of the delay circuit 20 rises, a decoder 22 for generating a set signal when the value counted by the counter 21 reaches a first predetermined value, and a set frequency detecting gate circuit 23 for generating a switching signal if a pulse of the rotational pulse signal is supplied thereto during a period from the generation of the output pulse of the delay circuit 20 up to that of the set signal to therefore supply the switching signal to a changeover switch 7. The set frequency detecting gate circuit 23 is composed of RS flip-flops 24 and 26 and AND gates 27 and 28.

Figure 5:
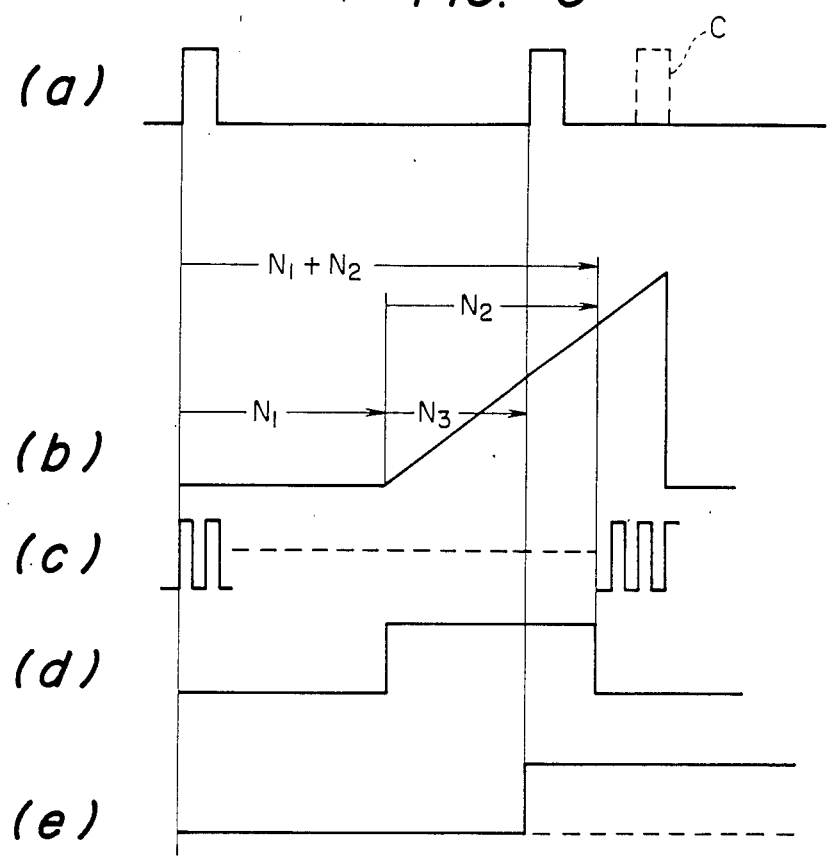
FIG. 5 consisting of (a)–(e) is a waveform chart illustrating the operation of the apparatus of FIG. 3.

In the recording disc rotary drive control apparatus thus constructed according to the present invention, a voltage is produced corresponding to the distance covered by a pickup 3 in moving from a reference position in the radial direction of the disc 1. The analog-to-digital converter 16 converts the output voltage of the position detector 9. The output clock pulse signal, having a frequency of $f_{CKO}$, from the reference oscillator 18 is divided by the divider 17 with the dividing ratio determined by the digital value, thereby producing a divided pulse signal having a frequency of $f_{CKF}$, as shown by waveform (c) in FIG. 5. The period of the divided pulse signal is proportional to the distance covered by the pickup 3. The rotational pulse signal as shown by waveform (a) in FIG. 5, which is produced by the frequency generator 13, is delayed in the delay circuit 20 by a predetermined number of divided pulses $N_1$ and supplied to the counter 21. With the output pulse of the delay circuit 2 as a trigger, the counter 21 begins to count the pulses of the divided pulse signal. Waveform (b) in FIG. 5 shows the counted value in an analog form. When the value counted by the counter 21 reaches a predetermined level $N_2$, the output of the decoder 22 goes to a high level, and that high level is supplied to the set frequency detecting gate circuit 23 as a set signal.

In the set frequency detecting gate circuit 23, the flip-flop 24 is set when the output of the delay circuit 20 is supplied thereto, and its output side Q goes to a high level, as shown by waveform (b) in FIG. 5, whereas the output side Q of the flip-flop 24 stays at a low level when the set signal is supplied thereto.

A gate pulse is produced during the period of the high level and, if a pulse of the rotational pulse signal is supplied when the counted value is $N_3$, for instance, while the gate pulse is present, the output level of the AND gate 27 will be inverted, going to a high level. Accordingly, the flip-flop 26 is set with its output side Q, or the output level of the set frequency detecting gate circuit 23, being a high level, as shown by waveform (e) in FIG. 5. The high level is produced as the switching signal. However, if the set signal instead of the rotational pulse signal is supplied while the gate pulse is present, the flip-flop 23 will be reset. Consequently, as the output level of the AND gate 27 stays at a low level, even if a pulse of the rotational pulse signal is supplied, as shown by a broken line C in waveform (a) in FIG. 5, after the generation of the set signal, the flip-flop 26 is not set, and thus the switching signal is not produced.

In this case, if the set signal, in place of the rotational pulse signal, is applied while the switching signal and the gate pulse are present, a flip-flop 25, set at the same time as the flip-flop 24, will not be reset by the output signal of the AND gate 27. Thus, the output side Q of the flip-flop 24 is at a high level when the gate pulse disappears. Accordingly, since the output level of the AND gate 28 is set to a low level by that high level, the generation of the switching signal is suspended.

In the recording disc rotary drive control apparatus according to the present invention, a set period is defined as a period of $(N_1+N_2)/f_{CKF}$, which is a reciprocal of the rate of rotation of the motor 2 at the periphery of the disc, thus enabling a playback period signal extracting circuit 5 to extract a playback synchronizing signal from the output signal of a signal processing circuit 4 and the set period to be made proportional to the distance covered by the moving pickup 3, even if $N_1+N_2$ is constant, because the frequency $f_{CKF}$ of the divided pulse signal is inversely proportional to the distance covered by the moving pickup 3. As a result, assuming that the period of the rotational pulse signal is shorter than the set period, the rate of rotation of the motor 2 is found to have reached the rate of rotation at the periphery, thus causing the above-described switching signal to be produced. While the switching signal is present, the control signal outputted from a control signal generating circuit 6 is applied to a driving circuit 8 by means of the changeover switch 6 to form a control loop.

Figure 2:
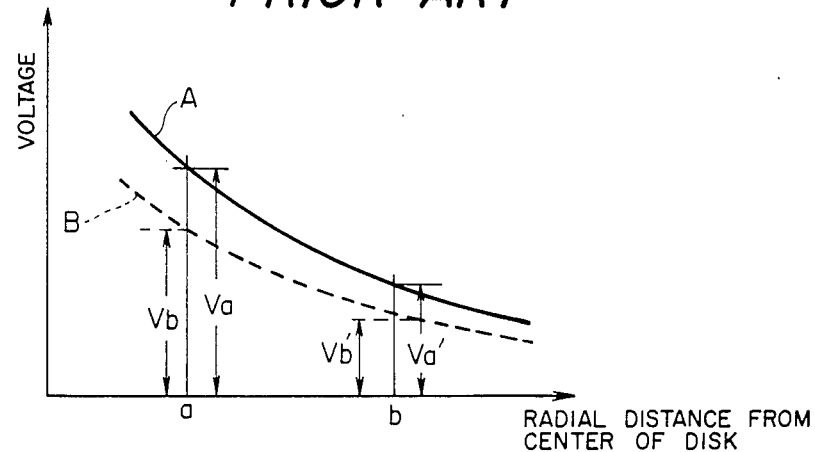
FIG. 2 is a graph illustrating the operation of the set voltage generating circuit in the apparatus of FIG. 1.

In FIG. 5, the product of the counted value $N_1+N_3$ and $1/f_{CKF}$ is equivalent to $V_a$ or $V_a'$ of FIG. 2, and the product of the counted value $N_1+N_2$ and $1/f_{CKF}$ to $V_b$ or $V_b'$ of FIG. 2. Consequently, $(N_1+N_3)/(N_1+N_2)=V_b/V_a$, and the ratio is constant, irrespective of $f_{CKF}$.

FIG. 6 show the construction of the analog-to-digital converter 16. In FIG. 6, a triangular wave generator 30 produces a triangular wave according to a first clock pulse signal having a frequency of $f_{CK1}$. The triangular wave from signal is supplied to a comparator 32 and there compared with the position detecting signal produced by the position detector 9. The first clock pulse signal is applied to a counter 32, which starts counting pulses of a second clock pulse signal, having a frequency of $f_{CK2}$, in response to the first clock pulse signal, and stops counting in response to the high level output from the comparator 31. The count value of the counter 32 is produced as an analog-to-digital converted signal. In this case, the frequencies $f_{CK1}$ and $f_{CK2}$ are not necessarily correlated, whereby the frequency $f_{CK1}$ is used as a sampling frequency and the frequency $f_{CK2}$ for determining resolution.

Although either the control signal or acceleration voltage $V_x$ based on the playback synchronizing signal is supplied to the driving circuit in the above-described embodiment of the present invention, it is also possible to supply one of the two control signals and the acceleration voltage $V_x$ by producing another control signal for controlling the rate of rotation of the motor on the basis of the output pulse signal from the frequency generator 13 and providing the set periods at two points to switch from one to the other. In addition, the acceleration voltage $V_x$ may be made changeable according to the output pulse signal of the divider 17 and that of the frequency generator 13.

As set forth above, in the recording disc rotary drive control apparatus of the invention, a position pulse signal having a period proportional to the position detecting signal produced by a pickup position detector and the position pulse signal is counted with the motor rotational pulse signal as a basis and, in case the rotational pulse signal is present until the counted value reaches a predetermined value, the rate of rotation of the motor is loop-controlled. Accordingly, a recording disc rotary drive control apparatus which is inexpensive and simple in construction is made available without using a costly divider requiring a complicated circuit configuration and an F/V converter as in the case of the prior art.

I claim:

1. A recording disc rotary drive control apparatus wherein data is written on a recording disc with a substantially constant packing line density, said control apparatus comprising: position detecting means for detecting a distance covered by a pickup for reading said recording disc, the pickup being moved from a reference position in the radial direction thereof, and producing a position detecting signal representing the distance covered thereby; first pulse signal generating means for generating a position pulse signal with a period proportional to said position detecting signal; a motor for rotating said recording disc; second pulse signal generating means for generating a rotational pulse signal having a frequency proportional to the rate of rotation of said motor; switching signal generating means for counting pulses of said position pulse signal starting with the generation of said rotational pulse signal, and producing a switching signal for a period from when a pulse of said rotational pulse signal is produced until the counted value reaches a predetermined value; control signal generating means for generating a control signal for controlling the rate of rotation of said motor according to the output signal of said pickup; means for generating an accelerating signal for increasing the rate of rotation of said motor; driving means for driving said motor according to a driving signal; and switching means for applying said control signal to said motor as said driving signal when said switching signal is present and applying said accelerating signal to said motor as said driving signal while said switching signal is not present.

* * * * *